United States Patent

[11] 3,555,312

| [72] | Inventor | Rene Bidard<br>Paris, France |
| --- | --- | --- |
| [21] | Appl. No. | 880,119 |
| [22] | Filed | Nov. 26, 1969 |
| [45] | Patented | Jan. 12, 1971 |
| [73] | Assignee | Compagnie Electro-Mecanique<br>Paris, France<br>a body corporate of France |
| [32] | Priority | Nov. 28, 1968 |
| [33] | | France |
| [31] | | No. 175,737 |

[54] MAGNETOHYDRODYNAMIC DEVICE FOR CONVERTING IN A REVERSIBLE MANNER THERMODYNAMIC ENERGY INTO ELECTRICAL ENERGY OF THE ALTERNATING CURRENT TYPE
12 Claims, 4 Drawing Figs.

| [52] | U.S. Cl. | 310/11 |
| --- | --- | --- |
| [51] | Int. Cl. | H02m 4/02 |
| [50] | Field of Search | 310/11;<br>60/202.3; 103/1 |

[56] References Cited
UNITED STATES PATENTS

| 2,698,127 | 12/1954 | Bowlus | 230/1 |
| 3,294,989 | 12/1966 | Eichenberger | 310/11 |
| 3,430,081 | 2/1969 | Zauderer | 310/11 |
| 3,478,234 | 11/1969 | Prem et al. | 310/11 |

*Primary Examiner*—D. X. Sliney
*Attorney*—Pierce, Scheffler & Parker

ABSTRACT: Magnetohydrodynamic device operable to convert thermodynamic energy into alternating current electrical energy comprises at least one closed loop placed completely within a multipolar magnetic field having a sliding characteristic for circulation of a conductive fluid. The fluid in the form of a gas-liquid emulsion passes along a portion of the loop with a velocity higher than that of the sliding field accompanied by an expansion of the emulsion, and the fluid in the form of a liquid following removal of the gas from the emulsion is then passed along another portion of the loop with a velocity lower than that of the sliding field accompanied by compression of the liquid.

To convert alternating current electrical energy into thermodynamic energy, the emulsion is passed along the loop through a portion of the sliding magnetic field with a velocity lower than that of the magnetic field accompanied by a compression of the emulsion, and the liquid is passed along another portion of the loop with a velocity higher than that of the magnetic field accompanied by an expansion of the liquid.

Inventor
René Bidard

Inventor
René Bidard

By Pierce, Scheffler & Parker
Attorneys

MAGNETOHYDRODYNAMIC DEVICE FOR CONVERTING IN A REVERSIBLE MANNER THERMODYNAMIC ENERGY INTO ELECTRICAL ENERGY OF THE ALTERNATING CURRENT TYPE

The present invention concerns the production of electric energy from the expansion of a gas and inversely the compression of a gas from an electric energy, and it also concerns a magnetohydrodynamic device operating by an emulsion and alternating current.

It is already known to obtain thermal cycles for the production of energy by means of magnetohydrodynamic machines traversed by an emulsified fluid formed of an electrically conductive liquid, on the one hand, and of bubbles of a compressible gas or vapor which is little soluble in the said liquid, on the other hand.

With these devices it is possible to obtain thermal cycles capable of producing electric energy by the consumption of heat, without the use of rotating machines operating at elevated temperature. In addition, thanks to the heat exchange between the liquid and the gas, the evolution of the latter can be close to the isotherm.

Different apparatuses of this type are known for producing loops of conductive liquid, placed completely in a uniform magnetic field, in which the liquid circulates in a closed circuit and is emulsified only in a limited energy-generating region. Reference in this respect is made to the French Pat. Nos. 1,442,336 of Jan. 29, 1965; 1,455,963 of July 23, 1965; and 1,494,159 of July 6, 1966. In these loops there are other regions which consume energy and whose function it is to restore the pressure of the nonemulsified liquid to its original value. In these known apparatuses the electric current produced, or consumed, is a direct current.

The present invention concerns a method of and a magnetohydrodynamic device for converting in a reversible manner thermodynamic energy into electric energy of alternating current from such loops of conductive liquid.

To this end the method and the magnetohydrodynamic device according to the invention use an effect similar to that used in asynchronous generators and motors with a solid rotor or squirrel cage. It is known that in generators of this type the stator, thanks to its polyphase winding, produces a rotating multipolar magnetic field, and that the rotation of the rotor at a speed higher than the synchronous speed of the rotating field, permits one to produce polyphase electric energy at the terminals of the stator.

The case of asynchronous motors is similar, except that the rotor turns at a speed lower than that of the rotating field.

In the magnetohydrodynamic device according to the invention, it is the liquid of the loops which plays the role of the rotor, and the operation of the asynchronous machine with the "solid rotor," consisting here of the fluid itself, is obtained according to the invention by taking measures so that the magnetic field is a sliding multipolar field and so that the relative velocities of the fluid with respect to this field are such that the relative sliding of the said fluid with respect to the magnetic field is positive in the generating regions where the emulsion expands, and negative in the consuming regions where the liquid is compressed; that is, so that the tangential velocities of the emulsion and of the liquid are higher and lower respectively than that of the sliding multipolar field in these regions. Since this situation depends only on the dimensions of the ducts in these different regions, it is always possible to obtain the desired value, positive or negative, of this "relative sliding," of the fluid with respect to the multipolar field.

One sees also that this result could be obtained without changing substantially the general geometry of the a.c. loops in which the evolution of the flow cross sections is exactly similar.

Several embodiments of the invention are described below by way of nonlimiting examples with reference to the attached drawings.

Figure 1:
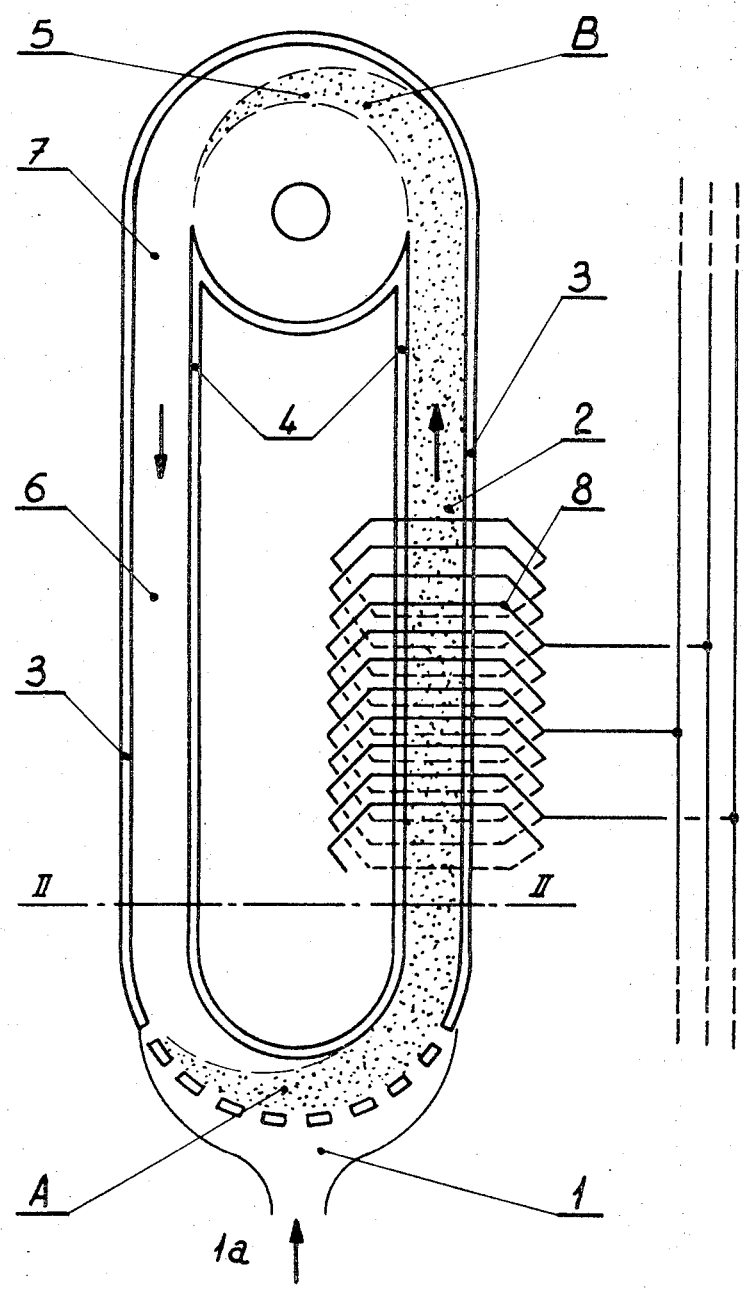
FIG. 1 illustrates the basic idea of the invention of which it shows schematically a first embodiment.
Figure 2:
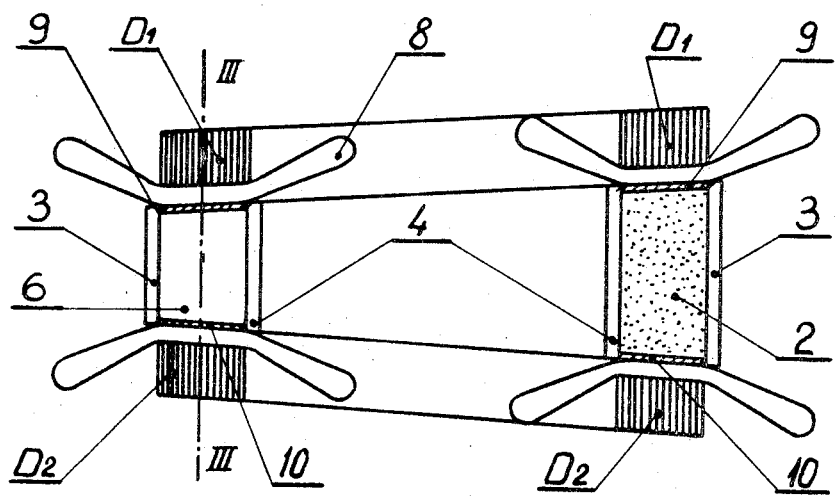
FIG. 2 is a sectional view along the line II–II of FIG. 1.
Figure 3:
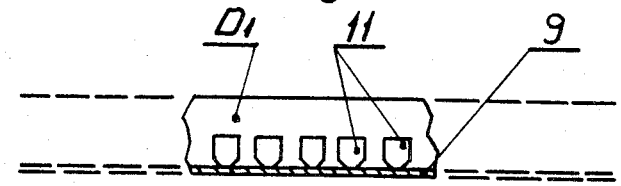
FIG. 3 is a sectional view along the line III–III of FIG. 2.
Figure 3:
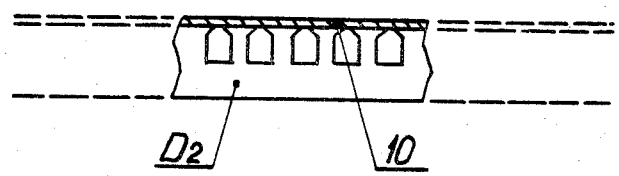

The magnetohydrodynamic device represented in FIGS. 1 to 3 comprises a single loop circuit with a general plane geometry.

In the loop circuit of FIG. 1, 1 denotes an emulsifier, 2 a generating duct, 3 and 4 electrodes forming "short circuit rings," 8 the winding of a stator, assumed here three-phase with three coils per pole and per phase, as an example, 5 a separator and 6 denotes the duct which brings the conductive liquid to the emulsifier while compressing it, thanks to the energy taken from the system (asynchronous magnetohydrodynamic pump).

The emulsifier 1 is represented by a plurality of orifices provided in the outer wall.

The gas introduced along the arrow 1a and coming from a suitable compressor (not represented) is discharged into the liquid through the above-mentioned orifices and is distributed by spreading uniformly in the entire cross section under the action of centripetal forces which act on the gas bubbles due to the curvature of the region A.

The complex fluid thus formed expands in the magnetohydrodynamic duct 2. The relative displacement of this emulsified liquid with respect to the sliding multipolar field produces a current distribution in the said liquid, currents which close again while passing through the electrodes 3 and 4 which play the same role as the short circuit rings of a squirrel cage of a conventional asynchronous rotor. These electric currents induce currents in the fixed winding of the stator, which will be described below, thus generating a three-phase electric energy.

The complex fluid, thus expanded, then follows a curve in region B where a separation of the bubbles is effected due to the curvature of the said region, the bubbles gathering toward the region with the lowest pressure, that is, toward the axis of the curve.

The separated liquid is taken up at 7 and compressed again in the duct 6. This recompression is obtained by an asynchronous magnetohydrodynamic effect under the same conditions as above, but by absorbing energy instead of producing it; this presupposes that the asynchronous displacement velocity of the liquid is in this region 6 lower than the sliding velocity of the magnetic multipolar field which is produced by the stator, which will be explained more fully below.

The invention consists thus in generating an alternating current, placing the entire loop or the entire assembly of loops in a multipolar magnetic field which is displaced along the said loops and so that, in the current-generating regions, the velocity of the emulsified fluid is slightly higher than that of the displacement of the field, and that in the energy-consuming regions, the velocity of the nonemulsified liquid is slightly lower than that of the displacement of the field.

In the emulsifying A and separating B regions, on the other hand, the arrangement is such that the displacement velocity of the liquid or emulsion is synchronous with that of the sliding multipolar magnetic field so that no energy is transferred, as far as possible, either in one or in the other direction.

All the above-mentioned conditions could be satisfied even if the linear displacement velocity of the field along the loops were not the same in all points of the said loops. However, the most simple thing seems to be to provide for a given loop, a sliding multipolar magnetic field with a constant linear velocity in the absolute system along the central line of the flow, which leads to polar intervals and to notch intervals which are equal all along the circuit of the central line of the loop.

As far as the stators and magnetic circuits are concerned, one can say in a very general manner that the construction of these machines is related both to that of asynchronous machines with a plane gap and to that of "linear motors." In the regions where the ducts of the loops are rectilinear, if they exist, there is an analogy to the "linear motors." In the curved regions, on the other hand, there is an analogy to the "flat motors."

On FIG. 1, for sake of simplicity, the electrical windings 8 of the coiled regions are represented schematically only on a limited region of the duct 2. But it must be understood that they must cover the whole length of both ducts 2 and 6, and can also in certain cases, as said further, cover the regions A and B themselves. As for ducts 2 and 6 these windings are both clearly visible in FIG. 2.

FIG. 2 shows a section along the line II–II of the loop represented in FIG. 1. In this figure one sees the stator in a section. This stator is here double, by way of example, since it is divided into two parts placed on either side of the loop. The said loop appears here cut through the ducts 2 and 6.

This figure also shows, in a section, the surfaces 9 and 10 which limit the duct of the loop at the top and bottom. Since they are perpendicular to the magnetic field, these surfaces are preferably made of an electrically insulating material. Magnetic circuits are provided, in the yokes D1 and D2 of which the sliding multipolar magnetic field is closed from pole to pole.

FIG. 3 represents a partial section along the line III–III of FIG. 2. One sees again the yokes D1 and D2 as well as the surfaces 9 and 10 which limit the duct.

Here it is assumed, by way of example, that the polyphase windings 8 are seated in conventional manner in straight notches 11 substantially perpendicular to the movement of the liquid.

In a first variant, these notches are distributed over the entire perimeter of the loop; in the curved regions, such as A and B, these notches are then substantially radial, as in a rotating machine with plane gap. It has already been mentioned that the velocity of the liquid in these regions is preferably synchronized with the multipolar field so that no energy is produced or consumed, in the said curved regions. Such a synchronization of the velocities could be obtained by suitable dimensioning of the flow section of the fluid in these regions.

In a second embodiment it is possible to eliminate any winding in these regions, if this is considered advisable. But in this case it is preferred to keep a coil-free magnetic circuit (or circuits) for the passage and the looping of the magnetic fluxes in these curved regions, as well as electrodes on the walls.

Currents appear in the fluid in these areas which tend to maintain and confirm the magnetic flux at the value which it had in the fluid at the time when the latter leaves the wound region of the stator; it is therefore advisable to reserve a path for the said magnetic fluxes (yokes) and also for the currents (electrodes). Such a distribution of currents is by itself synchronous, being carried by the fluid in its movement.

In the said second variation, it is advisable that the distribution of the flux carried by the fluid be in phase at the time when the fluid leaves the synchronous region and enters the following part of the loop, which comprises again polyphase multipolar windings in the stator, with the sliding magnetic field generated by the said windings. This condition is easily satisfied by winding this following region adequately.

One now comes to the rotor which consists, as mentioned above, of the flowing electrically conductive fluid. It could thus comprise, like a solid rotor, the whole of the induced current paths which can in fact close again laterally in the very mass of the fluid. However, this has the inconvenience of creating, in the fluid, pressure gradients perpendicular to its movement and particularly variable from one spot of the duct to the other with the volumetric density of the tangential electric currents thus produced. It seems preferable, in order to avoid this inconvenience, to provide conductive electrodes 3,4 on the walls of the ducts which are parallel to the induction vector, these electrodes performing the same function as the short circuit rings of the rotors with squirrel cage.

These electrodes 3,4 are then disposed in the same manner as the electrodes of devices with direct current according to the known patents, except that they are not connected to the outer circuit but are simply short-circuited in themselves, thus ensuring an electric continuity along the walls of the loop which are parallel to the magnetic induction vector, in the generating regions as well as in the consuming regions.

In addition, these electrodes are also provided, as far as possible, as has been seen above, in the curved regions A and B. To this end, the wall of the emulsifier 1, provided with holes, is conductive and serves as an electrode. Likewise the outer wall of the separator 3.

However, in the device described above, the gap between the two magnetic circuits differs generally according to the regions and/or the passage surfaces of the flux per pole. In fact, the volumetric flow of the fluid in the emulsified regions is about twice the amount in the nonemulsified regions so that, if one desires to avoid a too great variation of the fluid speed from one spot to the other, which seems desirable, the flow sections of the fluid must be different in duct 2 and in duct 6.

One way of eliminating this inconvenience, which has in addition great advantages from an electrical point of view, is the following: One superposes in the thickness of the gap, two loops similar to that of FIG. 1, in which the liquid rotates in the same direction, but turned by 180° with respect to each other in their plane, so that the emulsified duct 2a of one is adjacent to the nonemulsified duct 6b of the other, and separated from it by a preferably insulating horizontal wall 12, and vice versa the nonemulsified duct 6a of the former is adjacent to the emulsified duct 2b of the latter.

Figure 4:
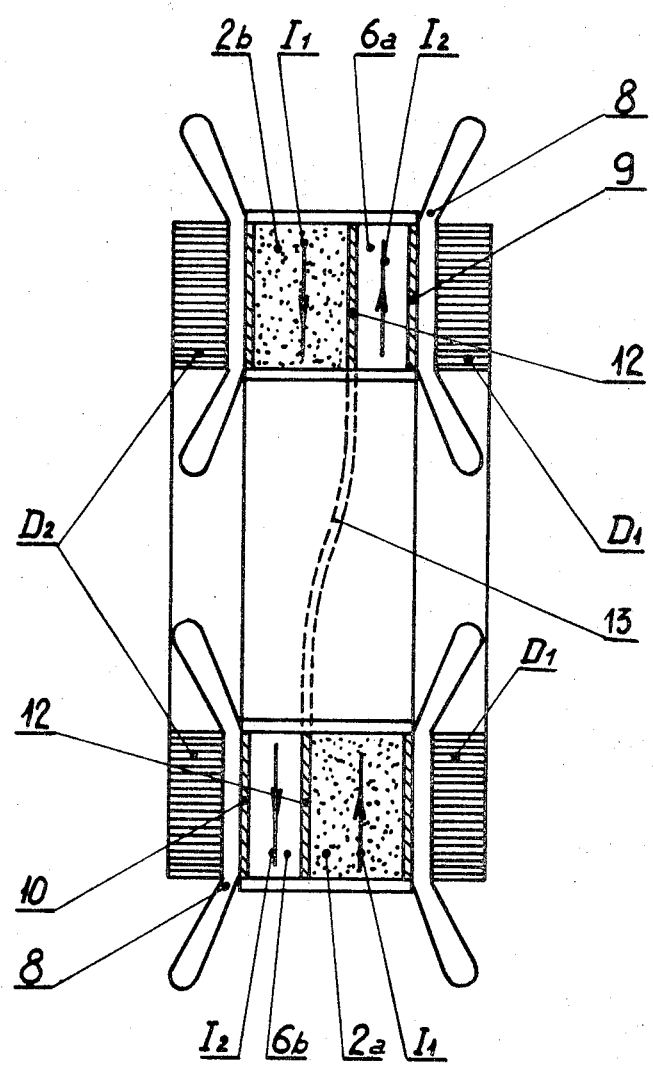
FIG. 4 is a sectional view, similar to that of FIG. 2 and shows another embodiment of the invention.

FIG. 4, where the same parts are designated with the same reference numbers as above, represents in a section similar to that of FIG. 2, such a solution.

This arrangement has not been represented in a plan: it is readily understandable that this double loop has at each end the separator of one loop and the emulsifier of the other, placed one above the other but separated by a partition which is a prolongation of the partition 12. Such a preferably insulating partition will have generally a helicoidal form 13.

Naturally the two loops in question are placed in parallel owing to the flow of the gas outlet.

One notes first of all that, thanks to the arrangement concerned, one can not only maintain the gaps at a constant value all along the double loop, but the width of the loop can also be kept constant over its entire length. The magnetic flux per pole can then also be kept constant from one end to the other, which simplifies greatly the winding of the stator.

One notes also in FIG. 4 that the electrodes of the two loops have been connected with each other, so that the assembly of the two loops presents only two "short circuit rings" 3 and 4, as if it were a single loop. This arrangement has in fact the following great advantage: Since the currents generated in the generating zone $I_1$, and in a consuming zone $I_2$ have inversely active energy components, the current $I_2$ can have its source in $I_1$ over the shortest path; in addition, these current components compensate partly each other electrically, which is of great advantage as far as the dimensioning of the stators is concerned, which only have to carry the single active current equivalent to $(I_1-I_2)$ and representing the single exported energy, and no longer the sum of this energy plus that of the pumping of the liquid.

There has been described about magnetohydrodynamic loops for the production of electric energy, which are generally hot, thanks to the expansion of a compressed gas. But the invention also concerns loops, which are generally colder in this case, absorbing on the contrary electric energy for the purpose of compressing a gas.

These loops comprise exactly the same elements as those described above and in the same order. Only the evolution of the flow sections and particularly the heights will be different and thus, due to this fact, the direction of flow of the energy.

The emulsifier can remain unchanged. The duct where the emulsion circulates will be a magnetohydrodynamic compressor and will absorb electric energy; the velocity of the fluid will be lower than the linear velocity of the sliding field; the volumetric mass of the complex fluid (liquid-gas) will increase in the direction of flow; its flow section will generally decrease, and the gas bubbles will be compressed there. The separator could also remain unchanged, and the portion of the conduit following it will generally in this case generate energy by the expansion of the conductive liquid, free of bubbles, circulating at a higher velocity than the linear velocity of the sliding field.

Such a magnetohydrodynamic device used as a gas compressor could be employed for example, for compressing, after cooling, the gas collected in the separator 5 of the magnetohydrodynamic device for generating alternating current described above.

In the foregoing considerations devices with a "plane gap" have been assumed but it goes without saying that devices with a cylindrical gap, such as those described in French Pat. No. 1,455,963 of July 23, 1965, could be converted to alternating current in a similar manner.

It is also understood that numerous modifications can be made in the embodiments described above by way of a purely indicative and by no means limiting example, without departing from the spirit of the invention. In particular several loops can be arranged in series on the gas path so that the gas is expanded (or compressed) by steps, thus producing (or absorbing) electric energy successively in said loops.

I claim:

1. The method for converting thermodynamic energy into alternating current electrical energy which comprises the steps of:

establishing at least one loop for circulation of a conductive fluid placed completely within a magnetic field having a sliding multipolar characteristic, introducing a gas into a conductive liquid at one part of the loop to establish a gas-liquid emulsion, passing said emulsion along the loop through a portion of said sliding multipolar field with a velocity higher than that of said sliding field accompanied by expansion of the emulsion, removing the gas from the liquid at another part of the loop to reestablish the liquid, and passing the liquid along another part of the loop through another portion of said sliding multipolar field with a velocity lower than that of said sliding field accompanied by a compression of the liquid.

2. The method for converting alternating current electrical energy into thermodynamic energy which comprises the steps of:

establishing at least one loop for circulation of a conductive fluid placed completely within a magnetic field having a sliding multipolar characteristic, introducing a gas into a conductive liquid at one part of the loop to establish a gas-liquid emulsion, passing said emulsion along the loop through a portion of said sliding multipolar field with a velocity lower than that of said sliding field accompanied by a compression of the emulsion, removing the gas from the liquid at another part of the loop to reestablish the liquid, and passing the liquid along another part of the loop through another portion of said sliding multipolar field with a velocity higher than that of said sliding field accompanied by an expansion of the liquid.

3. A magnetohydrodynamic device for converting thermodynamic energy into electrical energy of the alternating current type, or vice versa, which comprises at least one tubular loop located completely within a sliding multipolar magnetic field for circulation of a conductive fluid in a closed circuit, two opposite walls of said loop which are perpendicular to the magnetic field being preferably electrically insulating and the other two opposite walls parallel to the magnetic field being preferably electrically conductive to form short circuit rings for the conductive fluid, said loop including, in the case of conversion of thermodynamic energy into electrical energy an emulsified hypersynchronous energy generating region and a nonemulsified hyposynchronous energy consuming region, or in the case of conversion of electrical energy into thermodynamic energy an emulsified hyposynchronous energy consuming region and a nonemulsified hypersynchronous energy generating region, said emulsified and nonemulsified regions being separated by two intermediate regions which respectively connect said regions, an emulsifier disposed in one of said intermediate regions for introducing a gas into a conductive liquid to establish a gas-liquid emulsion, a separator disposed in the other of said intermediate regions for separating the gas from the liquid, and means for creating a sliding multipolar magnetic field along said loop, the flow sections of said loop in the case of conversion of thermodynamic energy into electrical energy being such that the tangential velocity of the emulsion in said emulsified region is higher than that of said sliding magnetic field while the tangential velocity of the liquid in said nonemulsified region is lower than that of said sliding magnetic field, whereas in the case of conversion of electrical energy into thermodynamic energy the flow sections of said loop are such that the tangential velocity of the emulsion in said emulsified region is lower than that of said sliding magnetic field while the tangential velocity of the liquid in said nonemulsified region is higher than that of said sliding magnetic field.

4. A magnetohydrodynamic device as defined in claim 3 wherein the flow section of said loop in said intermediate regions is such that the velocity of the fluid therein is equal to that of said sliding field.

5. A magnetohydrodynamic device as defined in claim 3 wherein said means for creating said sliding multipolar magnetic field is constituted by a winding distributed along said loop at least in said energy generating and energy consuming regions, said winding being seated in straight notches substantially perpendicular to the direction in which the fluid circulates, and said notches being formed in yokes disposed on opposite sides respectively of said loop in the vicinity of the insulating walls thereof.

6. A magnetohydrodynamic device as defined in claim 5, wherein said yokes have the configuration of closed rings which extend along said loop over its entire length and establish between themselves a plane gap in which said loop is seated.

7. A magnetohydrodynamic device as define in claim 3 wherein wall portions of said emulsifier and separator cooperate with the conductive walls of said loop to form short circuit rings.

8. A magnetohydrodynamic device as defined in claim 5 wherein only one tubular loop is provided and the gap formed by said yokes has a variable thickness which is a function of the flow sections of said loop.

9. A magnetohydrodynamic device as defined in claim 3 which comprises at least one pair of loops, said loops being traversed in the same direction by said fluid being fed with flows of gas in parallel, and being disposed in such relation that the generating and consuming regions of one loop are adjacent respectively to the consuming and generating regions of the other loop, the thickness of the assembly of said loops being constant and parallel to said magnetic field.

10. A magnetohydrodynamic device as defined in claim 9 wherein said means for creating said sliding multipolar magnetic field are common to said loops.

11. A magnetohydrodynamic device as defined in claim 9 wherein said loops are superposed in the gap of yokes disposed on opposite sides respectively of the loop assembly on which a winding serving to produce said sliding multipolar magnetic field is located, said gap having a constant width corresponding to the constant thickness of the loop assembly.

12. A magnetohydrodynamic device as defined in claim 3 which comprises a plurality of said loops arranged in series on the gas flow.